United States Patent Office 2,997,873
Patented Aug. 29, 1961

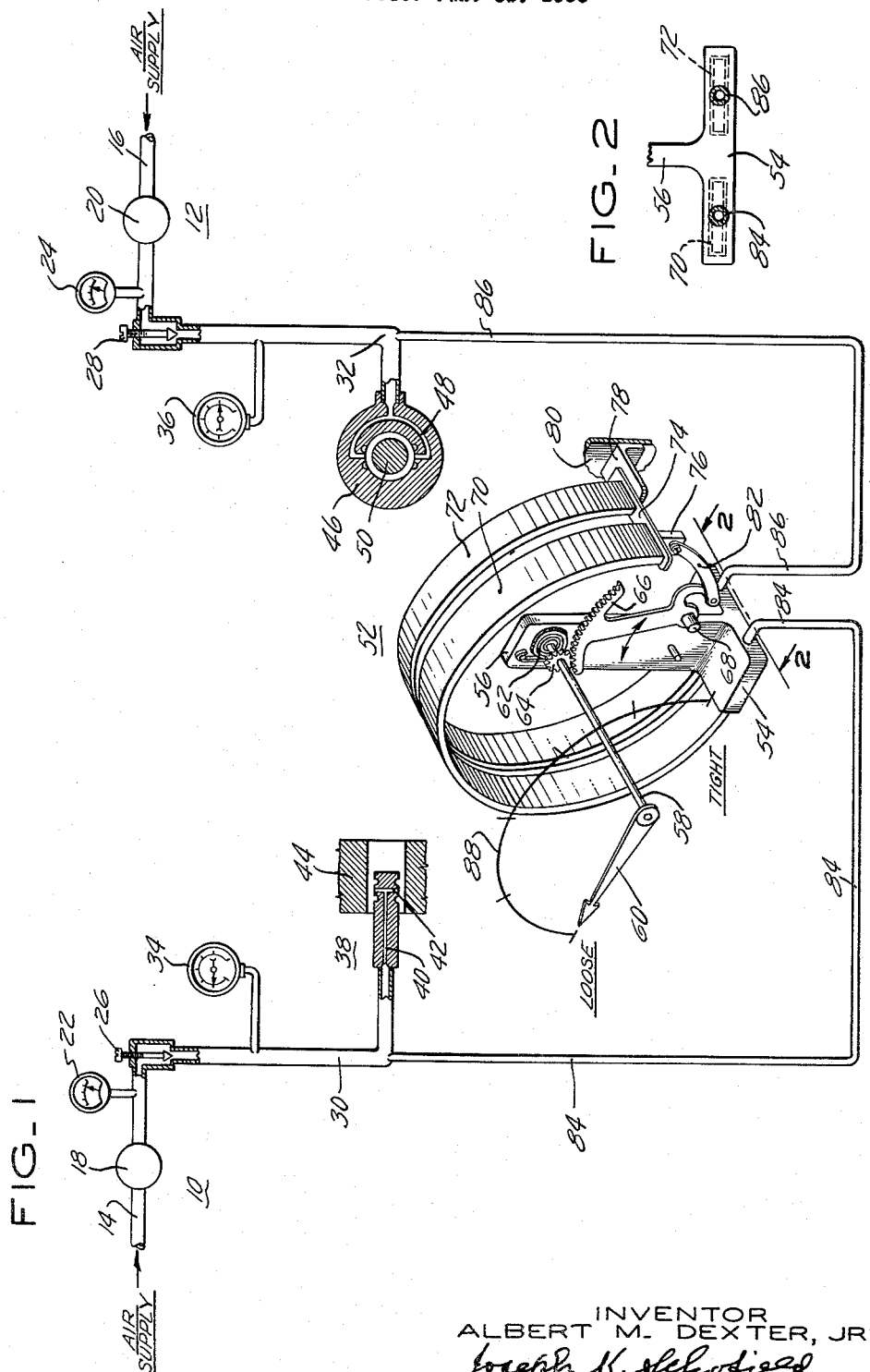

2,997,873
PNEUMATIC DIMENSION GAGE
Albert M. Dexter, Jr., Farmington, Conn., assignor to Pratt & Whitney Company, Incorporated, West Hartford, Conn., a corporation of Delaware
Filed June 11, 1956, Ser. No. 590,702
4 Claims. (Cl. 73—37.8)

This invention relates to an improved gaging system for measuring and indicating the difference of two measurements, and more particularly, to a fluid gage averaging device for utilization in such a system.

In the field of fluid gaging (particularly in the art of pneumatic gaging) a frequently encountered problem is that of quickly and accurately determining the average of two independently obtained fluid pressures, each of which is a function of some physical dimension. As a hypothetical case, consider the problem of ascertaining the relative fit between a cylinder bore and its mating piston. The inside diameter of the bore, and the outside diameter of the piston, are machined within certain manufacturing tolerances. Once the respective nominal diameters have been satisfied, our major concern is to determine the nature of the fit to be expected, when the parts are arranged in operative position, regardless of the respective dimensions per se. The difference of these measurements is a criterion of the fit or clearance between mated parts.

The present invention solves the problem by providing a gage comprising means for obtaining input pressure signals, and at least two pressure responsive means adapted to receive these signals as discrete inputs respectively. The pressure means each have a freely movable end portion, and these movable end portions are secured together by a common tie-means. The resultant displacement of the tie-means is a function of the average of the signal pressure magnitudes.

Accordingly, it is an object of this invention to provide an improved gage of the type described, which will indicate the average of two pressure magnitudes with accuracy and celerity.

Another object is to provide an improved gage which is simple of construction and inexpensive to manufacture.

The novel features which are believed to be characteristic of this invention are set forth with particularity in the appended claims. The invention itself, however, both as to its organization and method of operation, together with further objects and advantages thereof, may best be understood by reference to the following description when read in connection with the accompanying drawing in which:

FIGURE 1 is a partial pictorial-sectional view showing the improved gage in accordance with one illustrative embodiment of the invention, and FIGURE 2 is a view taken along the line 2—2 of FIGURE 1.

Referring now to the drawing, there is shown a fluid gaging system for deriving two fluid pressures which are functions of inside and outside diameter measurements respectively, and for applying these pressures as signal inputs to a fluid gage averaging device to obtain the average thereof. More specifically, in the embodiment here illustrated, the inside diameter measurement of a cylinder bore, and the outside diameter measurement of a coacting piston are derived, and applied to an averaging device to obtain the difference of these measurements as a criterion of the fit to be expected when the parts are arranged in cooperative mating relation.

The air gage apparatus for measuring the inside and outside diameters are indicated generally at 10 and 12 respectively. In this embodiment the fluid employed is air under pressure; however, any other non-corrosive fluid may also be used with equal facility. Air under pressure is supplied via conduits 14 and 16 to regulators, shown symbolically at 18 and 20 respectively. The operating pressures are indicated by means of pressure indicators 22 and 24 as will be readily seen from a study of the drawing. Adjustable restriction means (in this case needle valves) are shown at 26 and 28. The pressures in the conduits 14 and 16 read in the regions 30, 32 respectively (the so-called back pressures) are indicated on gaging indicators 34, 36 respectively. In the practical embodiment the indicators 34, 36 have been calibrated so as to give a linear dimensional reading directly without interpolation.

Referring to the air gage apparatus 10 for measuring inside diameters, the conduit 14 terminates in a plug member 38. The plug includes a longitudinal conduit 40 which is interconnected with a plurality of radial orifices 42 which are vented to the atmosphere. The cylinder bore 44 to be gaged is slipped over the plug member 38, as shown on the drawing.

In an analogous manner the conduit 16 of air gage apparatus 12 terminates in an outside diameter measuring ring member 46. The ring 46 includes a plurality of passages 48. A piston to be gaged is shown at 50. The arrangement is such that the air passes in both directions longitudinally down the piston to the ambient atmosphere.

The fluid gage averaging device is indicated generally at 52. In the illustrative embodiment here shown, the fluid gage averaging device comprises pressure responsive means in the form of a twin or matched Bourdon tube arrangement; however, it should be understood at this point that other pressure responsive means such as diaphragms, bellows, etc., may also be utilized within contemplation of the inventive concept herein described and claimed. The averaging device comprises a base 54 having an upright portion 56 which is adapted to support one end of a shaft 58. The shaft 58 carries a needle hand 60 and is supported at this end by any convenient means not shown on the drawing. A hair spring 62 and a pinion gear 64 are mounted on the shaft 58 in the manner shown. The gear 64 meshes with a gear segment member 66; the segment 66 rotates about a fixed pivot 68 (support not shown). A pair of twin Bourdon tubes 70, 72 are mechanically strapped together by means of member 74, which latter member includes an extending lug portion 76. The extreme downward displacement of the twin Bourdon tubes is defined by stop member 78 which is fixed to the gage housing shown partially at 80. A strap 82 is secured to member 74 by means of lug 76, and also to segment member 66, so that displacement of the twin Bourdon tubes is translated into an arcuate displacement of segment 66 as will presently be made clear.

The Bourdon tubes 70, 72 are secured to the lower end of the base 54 so as to be in pneumatic communication with conduits 84 and 86 respectively; these conduits are adapted to supply the pressures read on gages 34 and 36 to the gage averaging device 52. The Bourdon tubes 70 and 72 are so mounted that similar variations in pressures in conduits 84 and 86 cause their free ends to move in the same direction; that is, increased pressures in conduits 84 and 86 move the free ends of the tubes 70 and 72 outward and upward. Similarly, reduced pressures in conduits 84 and 86 move the free ends of tubes 70 and 72 inward and downward. Completing the description of the device 52, a calibrated dial 88 visually indicates the degree of the fit obtained between the mating parts in terms of the clearance thereof.

The pneumatic circuits 10 and 12 operate in a well-known manner. The object to be gaged and a gaging member are brought together in telescoping relationship. The arrangement is such that air is permitted to escape in the clearance afforded between the surface being gaged, and those of the orifices 42, the volume of air escaping being a function of the magnitude of the clearance between opposing surfaces. For example, in the circuit 10, if the inside diameter of the bore becomes smaller, less air is permitted to escape, and the pressure rises (read on meter 34). Similarly, in the circuit 12, if the diameter of the piston becomes smaller, more air is permitted to escape and the pressure falls (read on meter 36).

In operation, the proper adjustments are made in the inside and outside diameter measuring circuits 10 and 12, so that with a master bore 44 and a master piston 50, the gages 34 and 36 will have their indicating needles in the twelve o'clock position (vertical). For example, consider the situation where each gage is experiencing a pressure of 29 p.s.i. If the cylinder bore and piston being gaged are ideally perfect, the hand 60 of the fluid gage averaging device 52 will be in the twelve o'clock position indicating proper clearance between the coacting parts.

However, since we are interested in the difference in the measurements of mating parts, dimensional variations in the coacting parts are still permissible, provided the difference in magnitude remains the same or is within a predetermined range of tolerance. In order to point this up, consider a bore under test which is .0002″ smaller than standard, and a piston which is also .0002″ smaller than standard; the pressure for the bore will be higher, say 30 p.s.i. instead of 29 p.s.i., while the pressure for the piston will be 28 p.s.i. The average of 30 p.s.i. and 28 p.s.i. is still 29 p.s.i., and hence fluid gage averaging device 52 will still read twelve o'clock, thus indicating a proper fit.

In most applications manufacturing tolerances permit some deviations from standard. These may be appropriately indicated on the dial by marking the right side tight or +, and the other side loose or —, the scale in between being appropriately calibrated to indicate the magnitude of the clearance fit if such information is desired.

Various modifications of the illustrative embodiment shown in the drawing, and various equivalent or substitutes for the elements thereof, will readily occur to those versed in the art, without departing from the spirit or scope of the instant invention. The disclosure, therefore, is for the purpose of illustrating the principles of the invention which is not to be regarded as limited except as indicated by the scope of the appended claims.

What is claimed is:

1. A dimension gage of the pneumatic type comprising, means for obtaining input pressure signals as functions of the respective dimensions being gaged, two matched pressure responsive means adapted to independently receive said signals, each said pressure responsive means having a freely movable end portion, said movable end portions moving in the same direction for similar variation in pressure and said freely movable end portions being secured together by a common tie-means, whereby the displacement of said free end portions is a function of the average of the signal pressures applied to said pressure responsive means.

2. A dimension gage of the pneumatic type comprising, two arcuate tubes arranged in spaced parallel relationship to each other, the adjacent ends defining first and second pairs respectively, said first pair being open ended and held in a fixed position, the tube ends of said second pair being sealed and rigidly strapped together, first and second input signal means comprising air under pressure, the magnitude of said air signal pressures being functions of the respective dimensions being gaged, means for separately applying said signals to said open ended pair whereby the resultant displacement of the rigidly strapped ends is a function of the average of the signal pressure applied to the fixed ends of said tubes.

3. A gage according to claim 2, wherein indicating means are coupled to said rigidly strapped ends.

4. A dimensional gage of the pneumatic type comprising two Bourdon tubes arranged in spaced parallel relationship to each other, adjacent ends of said tubes defining first and second end pairs, the first end pair being open ended and retained in a fixed position, the ends of said second pair being individually sealed and rigidly strapped together, first and second input signals comprising air under pressure, means for applying said signals to said first pair respectively, said first signal means having a pressure which is a function of an inside diameter of a first object, said second signal means having a pressure which is a function of an outside diameter of a second object, whereby the resultant displacement of the rigidly strapped ends is a function of the degree of fit obtainable when the said objects are in cooperating relationship.

References Cited in the file of this patent

UNITED STATES PATENTS

| | | |
|---|---|---|
| 1,949,855 | Averill | Mar. 6, 1934 |
| 2,083,949 | Gravel | June 15, 1937 |
| 2,539,624 | Huggenberger | Jan. 30, 1951 |
| 2,684,594 | Furcini | July 27, 1954 |
| 2,731,825 | Levan | Jan. 24, 1956 |
| 2,779,188 | Meyer | Jan. 29, 1957 |
| 2,850,901 | Proctor | Sept. 9, 1958 |